Dec. 12, 1967 R. A. MUNSE 3,357,064
MOLDING CLIP
Filed Feb. 23, 1966 3 Sheets-Sheet 1
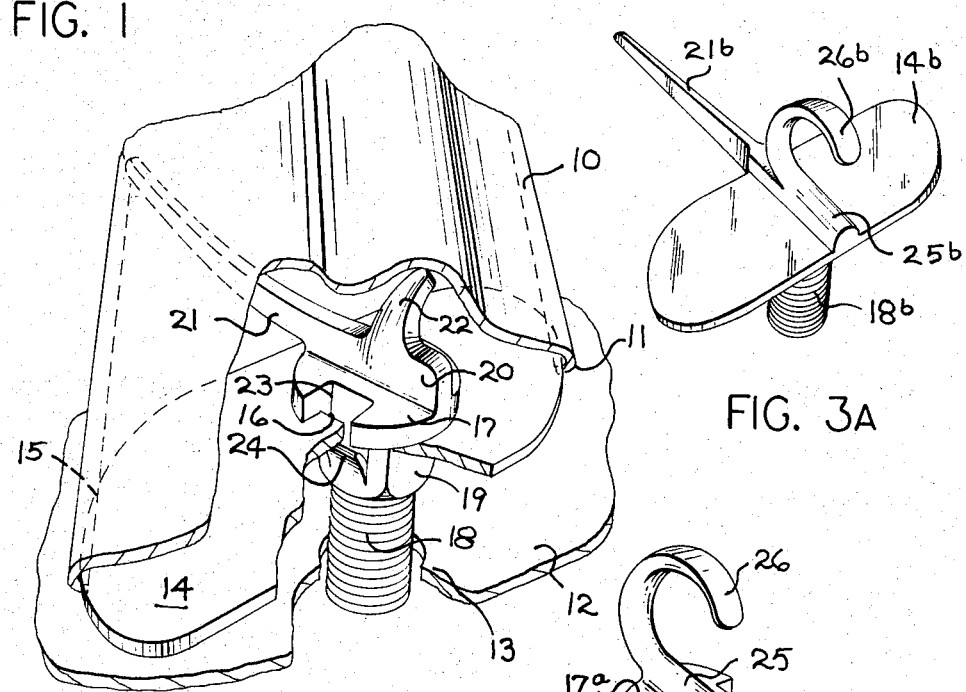
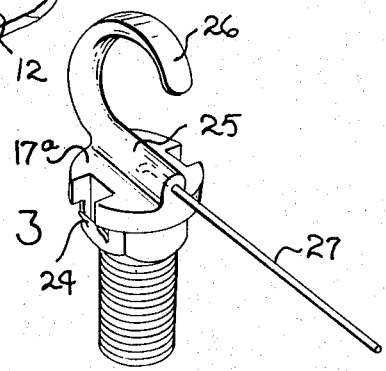
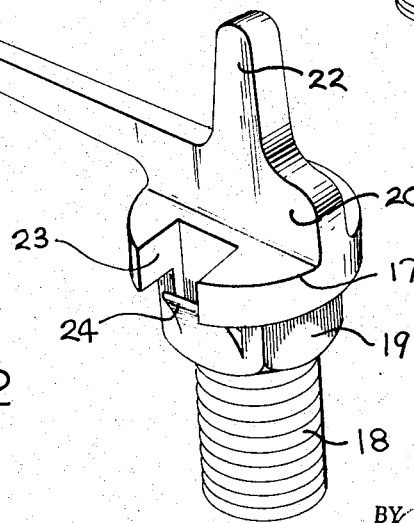
INVENTOR.
ROBERT A. MUNSE
BY
Fraser & Fraser
ATTORNEYS Dec. 12, 1967  R. A. MUNSE  3,357,064
MOLDING CLIP Filed Feb. 23, 1966  3 Sheets-Sheet 2

INVENTOR.
ROBERT A. MUNSE
BY
*Prazer & Prazer*
ATTORNEYS

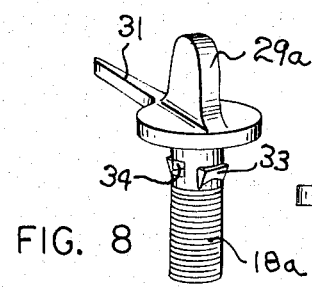
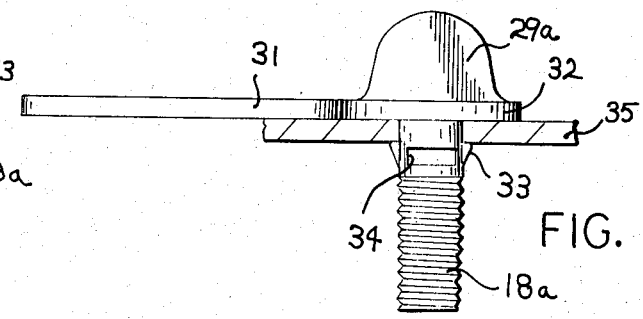
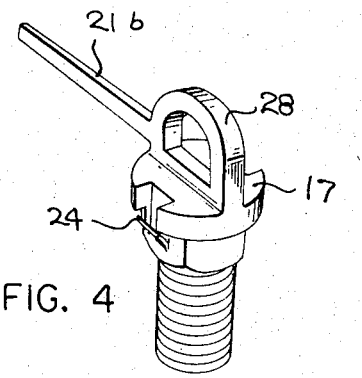
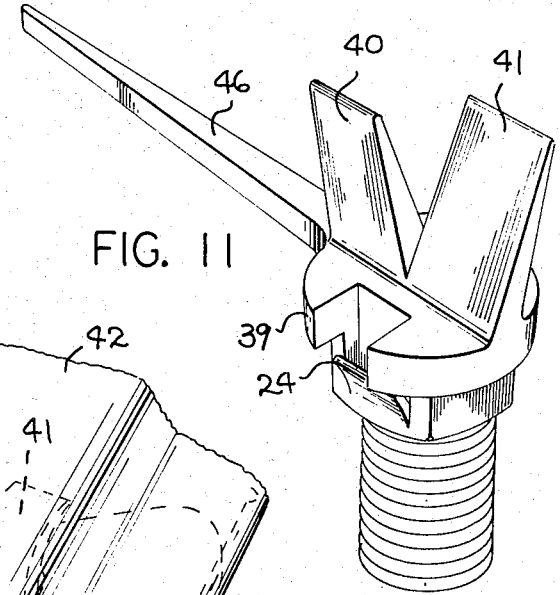
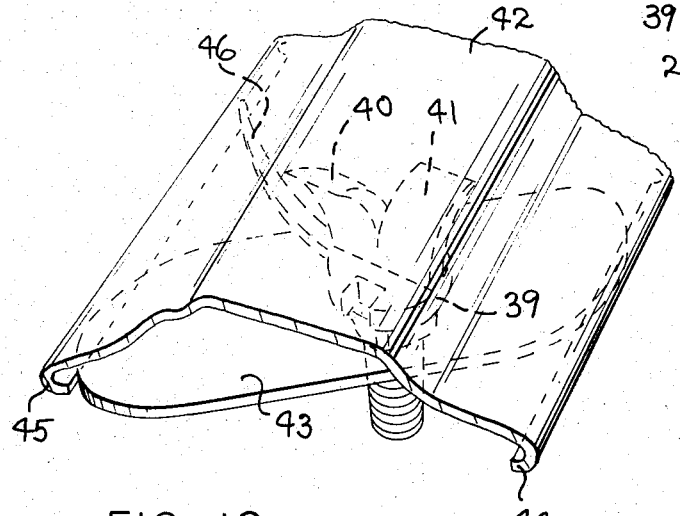

United States Patent Office 3,357,064
Patented Dec. 12, 1967

3,357,064
MOLDING CLIP
Robert A. Munse, Perrysburg, Ohio, assignor to The Bishop and Babcock Corporation, Toledo, Ohio, a corporation of Ohio
Filed Feb. 23, 1966, Ser. No. 529,572
3 Claims. (Cl. 24—73)

ABSTRACT OF THE DISCLOSURE

A trim molding clip for application to an apertured supporting panel and for use with a trim molding having spaced attaching flanges and an upwardly arched central portion in which the clip has a relatively flat plate including means for engaging the attaching flanges and an integral transverse rib on its upper surface with which a lateral spring finger is rigid. On top of the rib is a resilient tongue which impinges against the under side of the arched molding portion.

---

This invention relates to fasteners but more particularly to trim molding clips for attaching a trim molding to a supporting panel, such for example as on automobiles and refrigerators.

An object is to produce a new and improved trim molding clip, the body of which is wholly formed of non-metallic plastic material and is provided with a height control device to insure and facilitate proper assembly of the clip and molding, such device being resilient or rigid in accordance with the particular requirements.

Another object is to produce a fastener of the above character which, when the trim molding is applied, turns to effect more intimate engagement with the molding flanges.

A further object is to produce a simple and efficient molding clip of plastic material, such as nylon or acetal resin, which has the unique features of construction and operation hereinafter described.

Other objects and advantages of the invention will hereinafter appear and, for purposes of illustration but not of limitation, embodiments of the invention are shown on the accompanying drawings, in which FIGURE 1 is a fragmentary perspective view of a molding clip assembled with a trim molding and showing the same associated with an apertured supporting panel;

FIGURE 2 is an enlarged perspective view of the molding clip body without its transverse attaching plate and of the form shown in FIGURE 1;

FIGURE 3 is a perspective view of an alternate form of molding clip body without its transverse attaching plate showing a different form of height control device and a spring wire constituting the spring arm instead of the integral plastic finger shown on FIGURES 1 and 2;

FIGURE 3A is a top perspective view of a molding clip which is completely molded of plastic material and is somewhat similar to the clip shown on FIGURE 3;

FIGURE 4 is another form of molding clip body shown without its transverse attaching plate, the same being wholly of plastic material and showing a different form of height control device, the same being in the form of a resilient closed loop;

FIGURE 7 is a side elevation partly in fragment of a molding clip similar to that shown on FIGURES 5 and 6 but with a different means for securing the transverse plate to the body of the fastener;

FIGURE 8 is a perspective view of the plastic body of the clip shown on FIGURE 7, with the transverse metal plate removed;

Figures 9, 10:
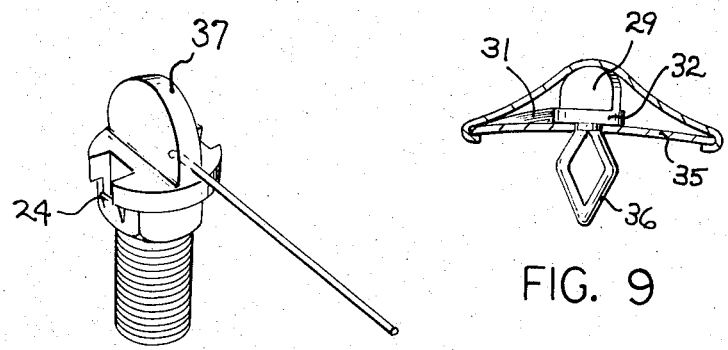
FIGURE 9 is a transverse sectional view of the trim molding and clip in assembled relation and showing an alternate form of dart for attaching the fastener to an aperture supporting panel.
FIGURE 10 is a perspective view of a portion of a molding clip formed with a rigid height control device but showing a spring wire arm instead of a plastic spring arm.

FIGURE 11 is an enlarged perspective view of a molding clip without the transverse metal plate and formed with a pair of integral upstanding divergent tabs to engage the underside of the trim molding and not only to afford a height control device but also to impart a component of turning movement to the plastic fastener when the trim molding is applied thereto; and FIGURE 12 is a fragmentary perspective view showing the assembly of the trim molding clip including the structure shown on FIGURE 11.

The illustrated embodiment of the invention shown on FIGURES 1 and 2 comprises a trim molding 10 of the usual form in which the crown of the molding is slightly offset laterally and which is formed with the usual longitudinally extending inturned edges or flanges 11 and shown beneath the molding is a supporting panel 12 provided with a hole 13. The clip comprises a flat transversely disposed sheet metal plate 14, having at opposite diagonally arranged corners cams 15 for engaging in the inturned flanges 11 respectively of the molding. The plate 14 is formed with a central square hole 16 and extending into this hole so that relative movement between the plate and fastener is prevented, is a one-piece molded plastic fastener having a circular disc-like body 17 and an axially disposed screw-threaded shank 18, which extends through the hole 13 of the supporting panel 12 to receive a nut for securing the clip in place. Intermediate the screw-threaded shank 18 and the body 17 is an intermediate portion 19 square in cross section and of a size snugly to fit the square hole 16 in the transverse metal plate 14. Rigid with the top surface of the body 17 and disposed centrally thereof is an upstanding flat sided narrow wall 20, from which extends in a radial direction a tapered spring finger 21, of the same thickness and height as the wall 20 where it joins the latter, the finger tapering therefrom to a smaller end portion to afford the desired spring action.

Rising from the central portion of the upstanding wall 20 at the center thereof is a tapered spring tongue 22 of the same thickness as the wall 20 and which is adapted to abut against the underside of the crown of the trim molding 10, so that when the latter is applied the tongue 22 is flexed as indicated on FIGURE 1 and the spring action insures proper connection between the side edges of the plate 14 and the inturned flanges 11, the spring tongue 22 thus affording a height control device.

To hold the cross plate 14 against the underside of the disc-like body 17 a pair of oppositely disposed cutouts 23 are formed in the body and adjacent portion of the intermediate portion 19 to enable the formation of outwardly inclined spring tabs 24, which abut against the underside of the plate 14 and are spaced from the underside of the body 17 approximately the thickness of the plate 14. Thus the shank 18 and intermediate portion 19 are inserted through the hole 16 of the cross plate, flexing the tabs 24 inwardly until they pass through the hole when they snap out to hold the plate against the underside of the body 17.

It will be understood that the cross plate 14 has a length which is greater than the width of the trim molding 10 and a width less than the distance between the inturned flanges 11, whereby the cross plate may be inserted between the inturned flanges and rotated until the ends thereof pass into the recesses formed by the flanges. Thus the ends bear against the trim molding so that the cross plate is maintained in an inclined position in relation to the axis of the molding. The spring arm 21 biases the plate into forced contact with the trim molding, as will be readily understood.

It will be understood that a nut is applied to the screw-threaded shank 18 on the underside of the plate 12 for securing the fastener in position. In use a number of fasteners of the above character will be arranged at intervals along the trim molding with corresponding holes in the panel.

In FIGURE 3 the disc-like body 17a, which is similar to that above described, is formed with a centrally disposed transversely extending upstanding rounded rib 25, which terminates at one end in an upwardly extending reversely curved C-shaped arm 26 affording the height control device and serving the same purpose as the spring tongue 22 above described. In this embodiment, there is provided a spring wire arm which serves the same purpose as the spring finger 21 above described. The wire arm 27 projects radially from the opposite end of the rib 25 and has its inner end anchored in the rib as by molding. In other words the wire arm 27 is in the mold when the part is formed and thus anchored securely in position. Otherwise the fastener is in accordance with that described in connection with the form shown in FIGURES 1 and 2.

The molding clip shown in FIGURE 3A is entirely of non-metallic plastic material and consists of a one piece molded structure having a depending threaded nut-receiving stem 18b, the upper end of which is integral with a flat plate 14b quite similar to the plate 14 above described but of course of plastic material instead of sheet metal. On the upper face of the plate 14b midway and extending transversely thereof is an integral upstanding rib or body 25b from which rises a reversely curved C-shaped spring arm 26b disposed wholly within the transverse dimensions of the plate 14b. Forming an integral continuation of the body or rib 25b and in alignment therewith is a spring finger 21b of tapered form. This provides a molding clip, which can be molded as a unitary structure which obviates assembly problems and reduces cost of production.

In the form shown on FIGURE 4 the structure is generally similar to that shown on FIGURE 3 except that the C-shaped spring arm 26 is replaced by a closed vertically extending spring loop 28, which rises centrally from the body 17b. Integral with the loop 28 and extending laterally therefrom is a spring finger 21b. The spring finger 21b is integral with and is of similar tapered form to that shown on FIGURE 1.

Figure 5:
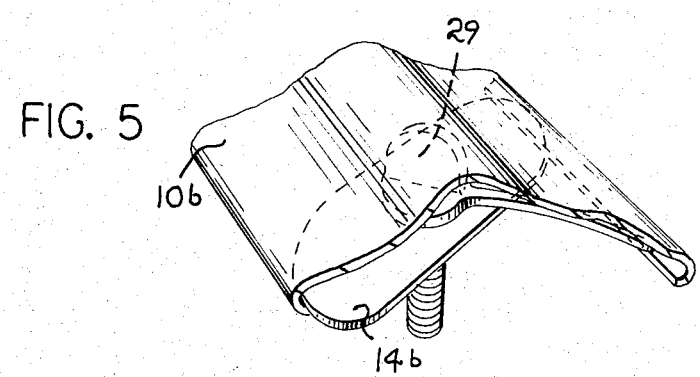
FIGURE 5 is a perspective view of another form of molding clip applied to a trim molding, the latter being shown in fragment, the height control device in this instance being a rigid one.
Figure 6:
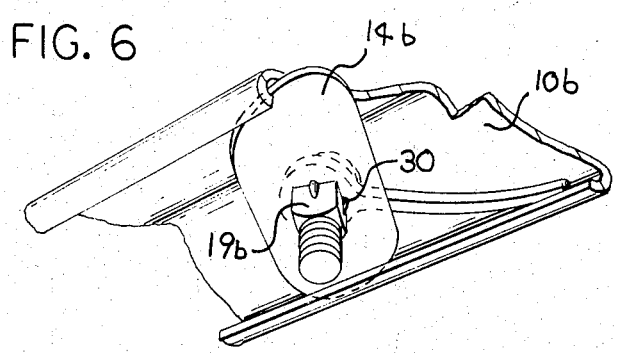
FIGURE 6 is a bottom plan view of the assembly shown in FIGURE 5.

Referring to FIGURES 5 and 6, the fastener there shown is somewhat similar to that shown on FIGURES 1 and 2 except that instead of a spring action height control 22, a rigid stop 29 is provided. This is in the form of a narrow flatsided plate having a curved upper edge portion to engage the underside of the trim molding. The plate 29 is of plastic material and is integral with the body. Lugs 30 are struck from the intermediate portion 19b to bear against the underside of the cross plate 14b to hold it in place. It should be noted that in this form the trim molding 10b is centrally arched and this arched portion engages the rigid stop 29, whereas in the molding according to FIGURES 1 and 2 the crown is off center. As a practical matter either fastener structure can be used with either form of molding.

In the form shown on FIGURES 7 and 8 a one-piece plastic fastener is shown which is also formed with a rigid arcuate stop plate 29a similar to the plate 29 of FIGURE 5. Extending laterally from the body 32 is a tapering spring finger 31, which is of the same thickness as the body, to lie within the same vertical and horizontal plane. For securing the transverse plate 35 in place the intermediate portion of the fastener between the body 32 and the screw-threaded shank 18a are outwardly extending lugs 33 which engage the underside of the plate 35. In order to afford flexibility to the lugs 33 to facilitate insertion through the hole in the plate 35 a transverse hole 34 is formed in the intermediate portion in the region of the lugs 33. Thus when the shank is forced through the hole in the plate 35 the lugs 33 can be flexed inwardly and then will snap out into plate engaging position, such as shown in FIGURES 7 and 8.

The fastener shown in FIGURE 9 is somewhat similar to that shown in FIGURES 7 and 8 and corresponding numerals have been used where the parts are the same. In this form of the fastener instead of employing a screw-threaded plastic shank to extend through the hole in the supporting panel, an integral plastic dart 36 is formed, this being an integral part of and depending from the underside of the disc-like body 32. The dart 36 consists of a pair of spring legs connected at the top to the body and having intermediate oppositely extending inclined portions, the lower ends of the arms being integrally connected. It will be readily understood that the dart 36 may be forced through the panel aperture and due to the inherent resiliency of the material the arms will flex inwardly to pass through the hole but after having passed through the hole they will abruptly flex outwardly into the position shown thereby to secure the fastener in cam-like action in the aperture of the panel.

The form shown in FIGURE 10 is similar to that shown in FIGURE 3 except that instead of a spring height control member, there is provided a rigid stop 37, as hereinbefore described. In this form, instead of a plastic spring finger, a spring wire arm 38 is used, this being embedded or molded in one side of the stop 37 and radiating therefrom.

Reference is now made to the form of the invention shown in FIGURES 11 and 12. This fastener is similar to the fasteners above described, in which there is a plastic fastener associated with a flat transversely extending plate. However, in this form of the plastic fastener there is a disc-like body 39 similar to that above described and at the central portion thereof and rising vertically therefrom are two tabs 40 and 41, which are of tapering rectangular form, the wider part being integral with the base and these tabs are arranged in divergent relation so that one inclines upwardly and laterally in one direction and the other one inclines upwardly and laterally in the opposite direction. When the trim molding 42 is applied with the flat transverse plate in position adjacent the inturned flanges 44 and 45 of the molding, the pressure of the molding against the tabs flexes them as shown in FIGURE 12 and thereby imparts a component of turning movement to the fastener which is aided by the action of the spring finger 46 with the adjacent flange 45. This urges the ends of the plate 43 into more intimate engagement with the flanges. Also, the spring pressure exerted by the tabs against the trim molding urges the fastener tightly against the supporting panel to which it is applied.

Suitable plastic material for the above described fasteners is nylon or acetal resin. It is to be understood that numerous changes in details of construction and arrangement may be effected without departing from the spirit of the invention, especially as defined in the appended claims.

What I claim is:

1. A clip having a biasing spring area particularly suitable in conjunction with moldings of the automotive type having attaching flanges and an upwardly arched central portion, comprising a relatively flat plate including means for engagement with said attaching flanges, a transversely disposed relatively narrow rib integral with and projecting outwardly from the upper side of said plate, means for attaching said plate to an apertured supporting panel, a spring finger rigid with said rib constituting substantially a continuation thereof and projecting laterally thereof for engagement with the molding for biasing said plate, and a resilient tongue integral with said rib for impinging against the under side of said arched portion of the molding.

2. A clip as claimed in claim 1 in which the clip is of molded plastic material except for said spring finger, said spring finger comprising a length of wire, the inner end of which is embedded in said rib.

3. A clip as claimed in claim 1 in which said tongue has one end rigid with said rib, said tongue curling upwardly and with the free end portion curving downwardly above, in alignment with and in spaced relation above said rib.

References Cited
UNITED STATES PATENTS

| | | | |
|---|---|---|---|
| 2,246,720 | 6/1941 | Churchill | 24—73 |
| 2,677,862 | 5/1954 | Flora | 24—73 |
| 2,893,087 | 7/1959 | Braibirger | 24—73 |
| 3,000,066 | 9/1961 | Cochran | 24—73 |
| 3,011,234 | 12/1961 | Fiddler | 24—73 |
| 3,038,223 | 6/1962 | Fiddler | 24—73 |
| 3,120,686 | 2/1964 | Pickering | 24—73 |
| 3,141,209 | 7/1964 | Van Buren | 24—73 |
| 3,242,543 | 3/1966 | Adams | 24—73 |
| 3,246,375 | 4/1966 | Landwer | 24—73 |
| 3,279,013 | 10/1966 | Fiddler | 24—73 |

EDWARD C. ALLEN, *Primary Examiner.*